United States Patent [19]

Kroon

[11] 4,140,910
[45] Feb. 20, 1979

[54] SELF-POWERED NEUTRON FLUX DETECTOR

[75] Inventor: John Kroon, Chagrin Falls, Ohio

[73] Assignee: Atomic Energy of Canada Limited, Ottawa, Canada

[21] Appl. No.: 791,645

[22] Filed: Apr. 27, 1977

[30] Foreign Application Priority Data

May 5, 1976 [CA] Canada ............................ 251830

[51] Int. Cl.² ............................................... G01T 3/00
[52] U.S. Cl. ........................................................ 250/390
[58] Field of Search ............... 250/390, 391, 392, 370, 250/371

[56] References Cited

U.S. PATENT DOCUMENTS

| | | | |
|---|---|---|---|
| 3,375,370 | 3/1968 | Hilborn | 250/390 |
| 3,787,697 | 1/1974 | Shields | 250/390 |

*Primary Examiner*—Davis L. Willis
*Attorney, Agent, or Firm*—Francis W. Lemon

[57] ABSTRACT

A self-powered neutron flux detector having an emitter electrode, at least a major portion of which is, $^{95}$Mo encased in a tubular collector electrode and separated therefrom by dielectric material. The $^{95}$Mo emitter electrode has experimentally shown a 98% prompt response, is primarily sensitive to neutron flux, has adequate sensitivity and has low burn up. Preferably the emitter electrode is molybdenum which has been enriched 75% to 99% by weight with $^{95}$Mo.

2 Claims, 1 Drawing Figure

U.S. Patent
Feb. 20, 1979
4,140,910
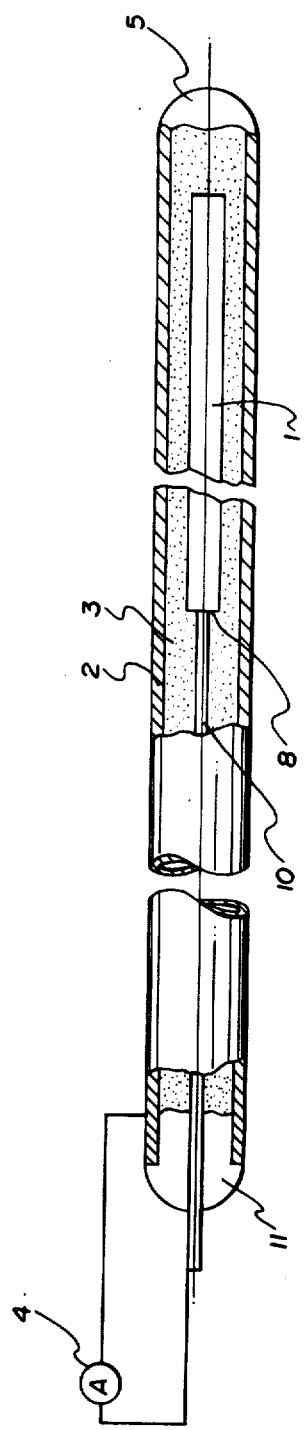

SELF-POWERED NEUTRON FLUX DETECTOR

This invention relates to a self-powered neutron detector.

During the last ten years or so research programs have been conducted in several countries to develop self-powered neutron detectors. These neutron flux detectors are particularly useful for neutron flux measurements in nuclear reactors where it is important to monitor the flux distribution within the core of the nuclear reactor.

These self-powered neutron flux detectors comprise a wire emitter electrode encased within a tubular collector electrode and separated therefrom by dielectric insulation. When the detector is disposed in a neutron flux, electrical currents of different magnitude are produced in the emitter and the collector and the neutron flux intensity is deduced from the magnitude of this difference.

To date, several emitter electrode materials have been proposed as having suitable nuclear and physical properties for nuclear reactor in-core flux measurements. They are rhodium, silver vanadium cobalt (see U.S. Pat. No. 3,375,370, dated Mar. 26, 1968, J. W. Hilborn), and platinum (see U.S. Pat. No. 3,787,697, dated Jan. 22, 1974, R. B. Shields). While emitter electrodes of these materials are useful, an analysis of the response characteristics of rhodium, silver, vanadium, cobalt and platinum shows that a need still exists for a prompt-response, neutron-sensitive flux detector. Other emitter electrode materials have also been proposed such as zirconium, palladium, cadmium, gadolinium and other rare-earth materials; however, they do not exhibit a useful neutron flux output characteristic for a sufficiently long-term for neutron flux monitoring in a nuclear reactor to be used commercially.

It is an object of the present invention to provide a self-powered neutron flux detector wherein the emitter electrode has a prompt response and the term of the neutron flux output characteristic is improved.

According to the present invention there is provided a self-powered neutron flux detector, comprising:
(a) an emitter electrode,
(b) a collector electrode, and
(c) dielectric insulation between the said electrodes, and wherein the movement comprises:
(d) at least a major portion of the emitter electrode is molybdenum isotope mass-number 95.

In the accompanying drawing there is shown, by way of example, as an embodiment of the present invention a sectional side view of a self-powered neutron flux detector.

Referring to the drawing there is shown a self-powered neutron flux detector, comprising:
(a) an emitter electrode 1,
(b) a collector electrode 2,
(c) dielectric insulation 3, and wherein the improvement comprises:
(d) at least a major portion of the emitter electrode 1 is molybdenum isotope mass number 95.

As this self-powered neutron flux detector is intended for use in the core of a nuclear reactor where mixed radiation is present, the metal from which the collector electrode 2 is made is preferably chosen from those commercially available that contain the least number of elements, and quantities thereof, that activate appreciably in neutron and gamma flux. For this reason the collector electrode 2 is made from a material selected from the group titanium, stainless steel and nickel-base alloys with the material containing less than 0.1 percent by weight cobalt and less than 0.2 percent by weight manganese.

The preferred material for the collector electrode 2 is a nickel base alloy containing by weight 76 percent nickel, 15.8 percent chromium, 7.20 percent iron, 0.20 percent silicon, 0.10 percent copper, 0.007 percent sulphur, and 0.04 percent carbon, with less than 0.1 percent by weight cobalt and less than 0.2 percent by weight manganese.

For this type of detector activation products that are beta emitters are undesirable, and because of this it would be desirable to limit the manganese content to less than 0.05 percent by weight, but as such a nickel base alloy is commercially available only as a special melt this has not been done.

More specifically alloy a 300 cm long by 0.51 mm diameter molybdenum 95 emitter electrode 1, having compressed metal oxide powder, for example, magnesium oxide powder, dielectric insulation 3 around it, is encased within a 1.57 mm outside diameter by 0.254 mm wall thickness tubular collector electrode 2 of a nickel-base alloy comprising by weight 76 percent nickel, 15.8 percent chromium, 7.20 percent iron, 0.20 percent silicon, 0.10 percent copper, 0.007 percent sulphur and 0.04 percent carbon, with less tha 0.1 percent by weight cobalt and less than 0.2 percent by weight manganese. The tubular collector electrode 2 has a closed end 5.

The emitter electrode 1 is joined by a mechanical bond 8 to a conductor 10 of a metal alloy marketed under the trade mark inconel. The detector is of the integral design with the collector electrode 2 forming a continuous outer sheath over the entire length of the detector. The complete assembly is hermetically sealed by seal 11 which may be an epoxy resin seal or a glass seal after outgassing, should this be necessary.

An electrical current meter 4 is electrically connected to the inner conductor 10 and the collector electrode 2.

The following Table 1 gives a response analysis for known types of self-powered neutron flux detectors having emitter electrodes of various materials.

TABLE 1

| Emitter | Absorption Cross Section | Reaction | Half-Life $t_{\frac{1}{2}}$ | Delayed Emissions After Long Exposure | Annual Burn-up in $10^{14}$ $n \cdot cm^{-2} sec^{-1}$ |
|---|---|---|---|---|---|
| Rh | 145b | (n,β) | 42 s | None | 27% |
| V | 5b | (n,β) | 3.7 min | None | 1.6% |
| Co | 37.3b | (n,γ) | prompt | $^{61}Co(T_{\frac{1}{2}} = 1.65h)$ | 10% |
| Pt | 10b | (n,γ) (γ,e) | 95% prompt 5% delayed $(T_{\frac{1}{2}} =$ | None | 1.8% |

TABLE 1-continued

| Emitter | Absorption Cross Section | Reaction | Half-Life I½ | Delayed Emissions After Long Exposure (30 min) | Annual Burn-up in $10^{14}$ n.cm$^{-2}$ sec$^{-1}$ |
| --- | --- | --- | --- | --- | --- |

Emitter electrode diameter is 0.51 mm.

It is seen from Table 1 that self-powered neutron detectors having emitter electrodes of Rh or V are of the delayed type and, therefore, suitable only in applications such as neutron flux-mapping.

The self-powdered neutron detector having an emitter electrode of Pt is primarily gamma-flux-sensitive since it is a high atomic number material. The current induced in a Pt emitter electrode is primaily due to Compton interaction and photoelectrons produced by gamma flux external to the self-powered neutron flux detector. The delayed fraction comes from the decay of $^{199}$Pt, which has a half-life of 30 min. In actual practice in a reactor environment, the self-powered neutron flux detector having a Pt emitter electrode is less prompt than indicated since some of the gamma flux response is from fission-product gamma flux which includes a wide range of half-lives. This reduces the overall prompt response of this type of self-powered detector in a heavy water moderated, natural uranium nuclear reactor to about 80%.

The self-powered neutron detector having an emitter electrode of Co is primarily neutron-sensitive, the current arising from Compton interaction and photo-electrons produced by neutron-capture gamma flux in the emitter electrode. Initially, this detector is 100% prompt, however, after exposure of about two years to a neutron flux of $10^{14}$ n.cm$^{-2}$ .sec$^{-1}$, the prompt fraction is about 75% only, the remainder being delayed emissions from $^{60}$Co and $^{61}$Co of the emitter electrode.

In summary, a 100% prompt, primarily neutron flux sensitive, self-powered detector is not available.

MOLYBDENUM CHARACTERISTICS

Turning now to self-powered neutron flux detectors having emitter electrodes of molybdenum isotope mass number 95, the following Table 2 lists the seven isotopes of which naturally ocurring molybdenum is composed and their thermal neutron capture cross-sections.

TABLE 2

| Isotope | Abundance in Natural Molybdenum % | Thermal Neutron Capture Cross Section in barns |
| --- | --- | --- |
| Molybdenum −92 | 14.8 | 0.006 |
| −94 | 9.1 | n.a. |
| −95 | 15.9 | 14 |
| −96 | 16.7 | 1 |
| −97 | 9.5 | 2 |
| −98 | 24.4 | 0.13 |
| −100 | 9.6 | 0.20 |

It will be seen from Table 2 that $^{95}$Mo has the largest neutron capture cross-section of the isotopes and that it is of sufficient magnitude to generate an electrical current, as an emitter electrode, using the same mechanism as has been previously described from the cobalt emitter electrode in Table 1.

In Table 3 there are listed some radioactive isotope species of molybdenum

TABLE 3

SOME RADIOACTIVE ISOTOPE SPECIES OF MOLYBDENUM

| Isotope | Half-Life | Type of Decay |
| --- | --- | --- |
| Molybdenum −90 | 5.7 h | beta, gamma |
| −91 | 15.5 min | beta |
| −93 | 3 × 10$^3$ y | K-capture |
| −99 | 66 h | beta, gamma |
| −101 | 14.6 min | beta, gamma |

Table 3 shows that there is an absence of radio-active isotope species of Molybdenum between 93 and 99. In fact, $^{96-97-98}$Mo are all stable isotopes. Thus the promptness of a self-powered neutron flux detector, having an emitter electrode of $^{95}$Mo at beginning of life is maintained throughout life, and this gives $^{95}$Mo a distinct advantage as the emitter electrode material over, say, cobalt for long-term neutron flux exposures.

CALCULATED DETECTOR CURRENTS

The following Table 4 shows the calculated output currents (calculated in the same manner as those given in U.S. Pat. No. 3,787,697) for a $^{95}$Mo emitter electrode. Iγ is the output current due to gamma rays and Inγ is the output current due to electron emission as a result of neutron capture in the emitter material.

Table 4

| | $^{95}$Mo Output Currents | |
| --- | --- | --- |
| I Total | Iγ(%) | Inγ(%) |
| 210 nA | 22 | 78 |

The above output electrical currents are for a self-powered neutron flux detector having an isotopically enriched (99.9% by weight) $^{95}$Mo emitter electrode as described with reference to the FIGURE and in a thermal neutron flux of $10^{14}$ n.cm$^{-2}$ sec$^{-1}$ for a gamma dose rate of 1.2 × $10^8$ rad. h$^{-1}$.

EXPERIMENTAL EVALUATION

A natural molybdenum detector, 300cm long by .46mm diameter, has been irradiated in a reactor where the neutron flux was measured to 1 × $10^9$ n.cm$^{-2}$ sec$^{-1}$ and the gamma flux 1.2 × $10^3$ rad. h$^{-1}$. From the measurements the neutron and gamma induced currents were determined and are tabulated in the following Table 5.

Table 5

| | Natural Molybdenum Output Currents | |
| --- | --- | --- |
| Total | Iγ(%) | In (%) |
| 1.9pA | 21 | 79 |

The delayed neutron response, primarily due to $^{101}$Mo and $^{56}$Mn, was estimated to be about 2% while the delayed gamma response is 7% (delayed fraction of fission gamma-rays in natural uranium reactor is 33%) for a total of 9%.

Therefore, the neutron sensitivity factor for natural molybdenum works out to be 1.5 × $10^{-21}$ A/(n.cm$^{-2}$ sec$^{-1}$) and the gamma sensitivity to $3.3 \times 10^{-16}$A/(-rad. h$^{-1}$). The gamma sensitivity was in close agreement as measured in a $^{60}$Co Gamma cell.

The output currents for a 75% by weight enriched $^{95}$Mo detector has been calculated from the ratio of the cross-section for natural molybdenum against $^{95}$Mo. This is summarized in Table 6.

TABLE 6

| Output Currents with 75% by Weight Enriched $^{95}$Mo | | |
|---|---|---|
| I Total | Iγ (%) | In (%) |
| 6.5pA | 6 | 94 |

The delayed response of this detector is only about 2%.

A similar platinum detector, 300cm long and 0.51mm diameter, was also irradiated which produced an output current of 5.7pA. Therefore the 75% by weight enriched $^{95}$Mo detector produces more current than a platinum detector and is primarily neutron sensitive.

BURN-OUT

In a neutron flux of $10^{14}$ n.cm$^{-2}$ sec$^{-1}$ for one year, the loss of sensitivity of a self-powered neutron flux detector having a $^{95}$Mo emitter electrode, 75% by weight enriched, is about 3.5%. The equivalent burn up rate for a self-powered neutron flux detector having a cobalt emitter electrode is 10%/year and so a $^{95}$Mo emitter electrode is more suitable from the point of view of long-term neutron flux exposures.

Thus it will be seen that $^{95}$Mo has desirable properties as an emitter electrode material for self-powered neutron flux detector, since it
  has about 98% prompt response
  is primarily sensitive to neutron flux
  has good sensitivity
  has low burn-up In addition the thermal neutron cross-section vs neutron energy curve shows that $^{95}$Mo is a good neutron flux detector in the thermal region. (The resonance integral for $^{95}$Mo is $\sim$ 100 b compared to $\sim$70 b for Co.).

Availability of enriched material is a problem; however, enriched $^{95}$Mo is available since it is formed as a by-product in $^{98}$Mo generation. ($^{98}$Mo is a precursor used in generating $^{99}$Tc radio-nuclides.).

I claim:
 1. A self-powered neutron flux detector, comprising:
  (a) an emitter electrode,
  (b) a collector electrode, and
  (c) dielectric insulation between the said electrodes, and wherein the improvement comprises:
  (d) at least a major portion of the emitter electrode is molybdenum isotope mass number 95.
 2. A detector according to claim 1 wherein the emitter electrode comprises molybdenum which has been enriched in the range 75% to 95% by weight with molybdenum isotope mass number 95.

* * * * *